United States Patent [19]

Mutter

[11] Patent Number: 5,014,871
[45] Date of Patent: May 14, 1991

[54] CLOSABLE VESSEL

[75] Inventor: Heinz Mutter, Winterthur, Switzerland

[73] Assignee: Sulzer Brothers Limited, Winterthur, Switzerland

[21] Appl. No.: 426,404

[22] Filed: Oct. 24, 1989

[30] Foreign Application Priority Data

Nov. 1, 1988 [CH] Switzerland ............. 04062/88

[51] Int. Cl.⁵ ............................. B65D 45/32
[52] U.S. Cl. ........................... 220/315; 220/319; 215/274; 292/256.63
[58] Field of Search ............. 220/315, 319; 215/273, 215/274; 292/256.6, 256.63

[56] References Cited

U.S. PATENT DOCUMENTS

| 700,344 | 5/1902 | Lispenard | 215/273 |
| 2,038,871 | 4/1936 | Mueller | 220/319 |
| 2,839,218 | 6/1958 | Zerbe | 292/256.6 |
| 2,847,143 | 8/1958 | Smith | 220/315 |
| 3,986,635 | 10/1976 | Niskin | 220/319 |
| 4,496,071 | 1/1985 | Stewart | 215/273 |
| 4,712,708 | 12/1987 | Taguchi | 220/315 |

FOREIGN PATENT DOCUMENTS

| 946580 | 6/1956 | Fed. Rep. of Germany | 292/256.6 |
| 1400751 | 11/1968 | Fed. Rep. of Germany | |
| 2339001 | 2/1974 | Fed. Rep. of Germany | 220/319 |
| G8803235 | 7/1988 | Fed. Rep. of Germany | |
| 542376 | 8/1922 | France | 215/273 |
| 814423 | 6/1959 | United Kingdom | 215/273 |
| 2123517 | 2/1984 | United Kingdom | |

Primary Examiner—Stephen Marcus
Assistant Examiner—S. Castellano
Attorney, Agent, or Firm—Kenyon & Kenyon

[57] ABSTRACT

The vessel comprises a part having an end portion which is introducible into a second vessel part and which has a cylindrical outside surface formed with an annular recess. The second vessel part has a connecting part having a cylindrical inside surface formed with a recess in the form of an annular groove and having a connecting duct which extends from the outside into the recess tangentially. When the two casing parts are in a connected position the two recesses bound a guide duct for a flexible closure part which is made, for example, of a steel string or cord or the like and which is introduced through the connecting duct into the guide duct to interconnect the two casing parts and withdrawn from the guide duct to release the two casing parts (1, 1a, 2a). The vessel is of use, particularly in association with a facility for filling a gas fuel tank, as a pressure-resistant casing for control and/or switching elements and can be opened with reduced manual intervention for the inspection and servicing of the latter components and closed reliably.

12 Claims, 1 Drawing Sheet

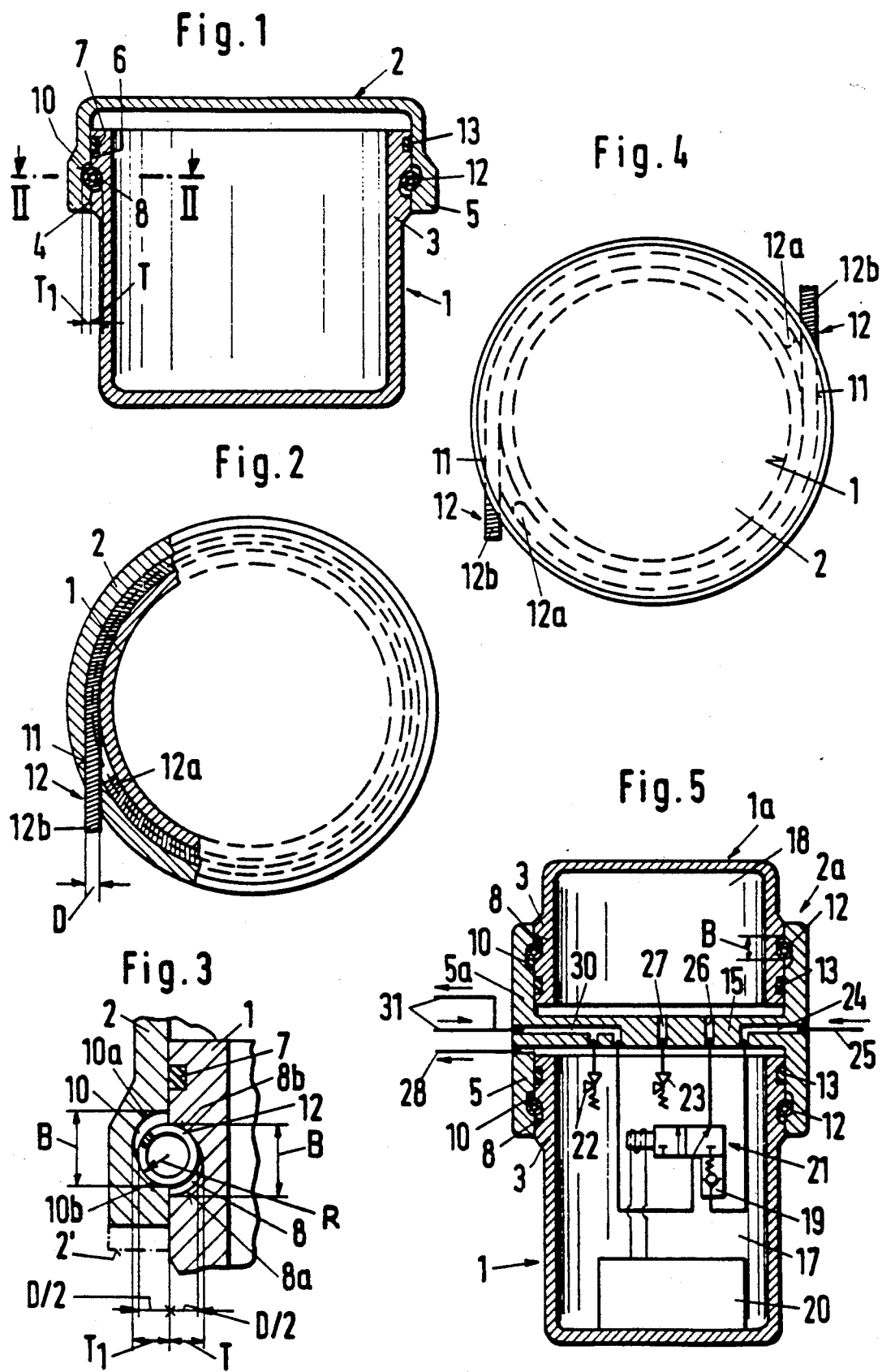

CLOSABLE VESSEL

The invention relates to a vessel, more particularly to a pressure vessel having at least two releasably interconnectable parts.

As is known, pressure vessels have been constructed with parts which have engageable flanges and which are interconnected by screws disposed in the flanges. However, these constructions require considerable labor to close and open the vessel. It is also known for the vessel parts to have flange parts which can be clamped together after the fashion of a bayonet fastening, the flange parts being moved into and out of engagement with one another by a corresponding relative displacement of at least one of the parts. The latter constructions call for less labor to connect and disconnect the parts but the production of the parts, which must be adapted to one another with appropriate accuracy, is relatively complex and costly.

In other cases, for example as described in U.S. Pat. No. 4,496,071 and German Gebrauchsmuster 8803235.3, pressure vessels have been known to employ such as wire springs and the like for securing an enclosure to the end of the cylinder. In such cases, the components to be secured together have been provided with grooves of hemispherical cross-section as well as with a duct so that the wire may be threaded through the duct into and around the facing grooves. However, in such cases, the wires tend to occupy the entire cross-section of the facing grooves so that the wires may become jammed during insertion. In addition, where the wires are to be removed, it may well happen that the wires become fixed between the components so that dislodgement from the grooves is not possible without the exertion of substantial pulling forces.

Accordingly, it is an object of the invention to provide a relatively simple closure part for securing two parts of a pressure vessel together.

It is another object to the invention to provide a closure for a pressure vessel which can be readily released.

It is another object to the invention to improve the connection of pressure vessel parts together and to provide for a ready release of the parts.

Briefly, the invention provides a pressure vessel which has a first part defining a pressure chamber with a wall at one end having an external groove of a predetermined depth and a second part defining a cover and having a circumferencial wall concentric to the wall of the first part with an internal groove of a predetermined depth facing the external groove of the first part as well as with a duct extending through the wall in communication with the internal groove. In addition, the pressure vessel includes a flexible rod-like closure part which can be slidably mounted in the grooves to secure the parts together. This closure part is insertable through the duct in the second part in order to move into and out of the facing grooves. In accordance with the invention, the closure part has a diameter or cross-sectional dimension less than the sum of the depths of the grooves in the pressure vessel parts.

The closure part is dimensioned relative to the grooves so that at least one of the grooves has a depth greater than one half the diameter of the enclosure part. In addition, at least one of the grooves has a width greater than the diameter of the closure part in order to permit relative axial movement between the first and second parts of the pressure vessel, for example when the closure part is to be inserted or removed. At least said one groove is also of a decreasing depth over the width thereof with the largest depth distal from the end of the wall in which the groove is formed. In this respect, the smallest depth of each groove is equal to one half the diameter of the closure part.

The closure part is sized so that when the grooves of the vessel parts are in alignment, there is a substantial clearance for the closure part to be threaded into and out of the facing grooves without sticking. After insertion, the vessel parts may be moved axially relative to each other, e.g. under the pressure within the pressure vessel so that the closure part engages each groove at the smallest dimension in a tight fit sealing manner. Subsequently, when the pressure vessel is to be opened, the pressure is relieved and the parts move relative to each other so that the closure part is disposed within the largest dimensions of the facing grooves so that a clearance is again provided to facilitate removal of the closure part.

These and other objects and advantages of the invention will become more apparent from the following detailed description taken in conjunction with the accompanying drawings wherein:

FIG. 1 illustrates a view in longitudinal section of a vessel according to the invention;

FIG. 2 illustrates a plan view of the vessel in partial section on the line II—II of FIG. 1;

FIG. 3 illustrates a detail of the closure used in the vessel of FIG. 1 to an enlarged scale;

FIG. 4 illustrates a plan view of a further closure in accordance with the invention; and FIG. 5 FIG. 5 illustrates a cross-sectional view of another vessel according to the invention.

Referring to FIG. 1, the pressure vessel comprises a cylindrical first vessel part 1 to define a pressure chamber and a second part 2 defining a cover for the first part 1. The first part 1 has a circumferential wall at an end portion 3 introducible into the part 2 and having a cylindrical outside surface 4. The second part 2 has a connecting part 5 in the form of cylindrical wall having a cylindrical inside surface 6 whose diameter is greater by a slight clearance than the diameter of the outside surface 4.

The outside surface 4 of the first part 1 is formed over the periphery with two recesses in the form of ring grooves 7, 8. The connecting part 5 is formed in the groove 10 whose cross-section corresponds substantially to the cross-section of the groove 8. Also present in the part 5 is a connecting duct 11 (see FIG. 2) which extends tangentially into the groove 10 and whose cross-section is greater than the cross-section of the groove 10. The grooves 8, 10, are so disposed as, when in the position illustrated in which the parts 1 and 2 are interconnected, to bound a channel which extends around the end portion 3 and which is effective to guide a flexible rod-like closure part 12 introducible through the connecting duct 11 into the guide channel, the length of the closure part 12 corresponding, as can be seen in FIG. 2, substantially to the sum of the developed length of the guide channel plus the length of the connecting channel 11.

Referring to FIG. 3, the groove 8 has a depth T and the groove 10 has a depth $T_1$, each less than the thickness D (i.e. diameter) of the closure part 12, such thickness corresponding substantially to the sum of the depths T and $T_1$. A ring seal 13 (FIG. 1) is received in the groove 7 and seals the gap between the vessel parts 1, 2.

To interconnect the two parts 1, 2, the closure part 12 is introduced through the duct 11 into the guide channel until the inner end 12a (FIG. 2) substantially meets that portion of the closure part 12 which extends through the duct 11, so that the two parts 1, 2 are secured relative to one another. To release the two parts 1 and 2 from one another, the closure part 12 is held at the end 12b projecting from the duct 11 and withdrawn from the guide channel so that the part 2 can be removed from the part 1.

The closure part 12 can take the form, for example, of a solid-section plastics rod or, as shown in FIG. 1, a flexible tubular element of annular cross-section. Referring to FIGS. 2 and 3, the closure part 12 can take the form of a string or cord or the like made of steel wire and coiled like a helical spring or be made of some other appropriate material such as metal or plastics. The use of an appropriately dimensioned steel string or cord as the closure part 12 is advantageous in pressure vessels, particularly of the kind which have to withstand relatively high pressures. A steel string or cord of e.g. 4 to 5 millimeter (mm) diameter used as closure member 12 does not deform permanently when used in a pressure vessel of e.g. 200 millimeters (mm) diameter and designed for a pressure of e.g. from 10 to 20 bar and thus ensures a reliable connection and release of the two parts 1, 2.

Referring to FIG. 3, the grooves 8, 10 can each be of a width B greater than the thickness of the closure part 12 by a clearance permitting relative movements between the parts 1, 2 interconnected by the part 12. The depths $T$, $T_1$, of the grooves 8, 10 can each be greater than half the thickness (D/2) of the closure part 12 by a corresponding clearance permitting a release position of the respective outer and inner peripheries of the closure part 12 introduced into the guide channel. As can also be gathered from FIG. 3, the grooves 8, 10 can each have a depth which decreases over the width B, the greatest depths $T$, $T_1$, being present on that inner edge part 8a, 10a, of the respective groove 8, 10, which is distal, i.e., further away from, the open end of the particular vessel part 1, 2 concerned, while the smallest depths are present on that outer edge part 8b, 10b of the respective groove 8, 10b which is nearer the end of the vessel part 1, 2 respectively. The smallest depths correspond to half the thickness (i.e. diameter) of the closure part 12. Consequently, the vessel part 2 is movable between the operative position, which can be seen in FIG. 3 and in which the closure part 12 is retained between the outer edge parts 8b, 10b of the grooves 8, 10, and a fitting and release position 2' which is shown in chain-dotted line and in which the groove inner edge parts 8a, 10a of depths $T$, $T_1$, are opposite one another and extend around the closure part 12 with clearance all the way round. The closure part 12 can therefore readily be introduced into and withdrawn from the guide channel in this fitting and release position 2'.

As a result of an internal pressure in the vessel, the part 2 is raised from the position 2' into the operative position shown in FIG. 3 and retained by the closure part 12 clamped between the edge parts 8b and 10b.

In another possible construction just one of the grooves 8 or 10 has the relatively large dimensions hereinbefore described which permits relative movement of the parts 1, 2 and the release of closure part 12.

The closure part 12 embodied by a metal wire or the like or by an appropriate flexible tube can have a central filling, such as a strand of plastic fibers. In another embodiment (not shown), a corresponding closure part can be embodied by a wire or plastics cable. Another possibility is for the closure part to be embodied by a plastics strip or band or the like.

The parts 1, 2 can be formed with two or more annular grooves 8, 10 respectively which are disposed one beside another to receive two or more closure parts 12. According to FIG. 4, the connecting part 5 can be formed with two connecting channels 11 which join the groove 10 tangentially and through which two closure parts 12 can be introduced into the guide channel, each closure part then extending over half the periphery of the end portion 3 of the vessel part 2. Instead of annular grooves 8, 10, corresponding helical grooves (not shown) can be present in the end portion 3 and connecting part 5 respectively and can receive a correspondingly longer closure part 12 which extends around the end portion 3 through an angle of more than 360°.

Referring to FIG. 5, the vessel may also be constructed of two parts 1, 1a, which are connected by a common part 2a having a partition 15 and two connecting parts 5, 5a connectable to the end portions 3 of the vessel parts 1, 1a, respectively. The parts 1, 1a are, as hereinbefore described, each releasably connected by way of a closure part 12 to the vessel part 2a.

The vessel of FIG. 5 is effective as a casing of a safety unit of a facility (not shown) for charging a gas fuel tank. Facilities of this kind, which are not the subject of the present invention, have been described in U.S. patent applications Ser. No. 07/223,584, filed July 22, 1988 and Swiss Patent Application No. 00581/88.0.

As shown in FIG. 5, the casing of the safety unit is subdivided into a fittings chamber 17 embodied by the part 1 and a buffer chamber 18 sealed off from the chamber 17 and formed by the casing part 1a. Fuel-flowed-through fittings, associated connecting and switching stations and a control unit 20 which are important for controlling the facility can be received in the chamber 17. Of these fittings, there can be seen in FIG. 5, a selector valve 21 with an associated check valve 19, a pressure limiting valve 22 and a safety valve 23.

The selector valve 21 has one inlet connected by way of a duct 24 in the partition 15 to a feed line 25 for gas fuel, the outlet of the valve 21 being connected by way of a corresponding duct 26 to the buffer chamber 18. The buffer chamber 17 also communicates by way of a duct 27 and the safety valve 23 with the fittings chamber 17 and, in a manner not further shown, with the inlet side of a filling compressor of the facility. The second inlet of the valve 21 and the pressure-limiting valve 22 are connected by way of a duct 30 to a compressor feed line 31 which is connected to the gas fuel tank to be filled. The fittings chamber 17 is also connected to a discharge line 28 extending away from the zone where the filling facility is disposed.

By way of the control facility 20, for example, when the compressor reaches a feed pressure predetermined by the ambient temperature, the valve 21 is changed over into the operative position which is illustrated in FIG. 5 and in which the feed of gas fuel is stopped and, the compressed gas fuel discharges from the feed line 31 through the valve 21 into the buffer chamber 18. The safety valve 23 limits the pressure in the buffer chamber 18 to a predetermined value of, for example, 2 to 3 bar.

The pressure-limiting valve 22 limits the pressure in the feed line 31 to a predetermined peak of e.g. 100 bar. When these pressures are exceeded, the gas fuel discharges through the safety valve 23 and pressure-limiting valve 22 into the fittings chamber 17 and is carried off to the outside through the discharge line 28. In the other switch position of the selector valve 21, the supply of gas fuel through the feeder line 25 into the buffer chamber 18 is permitted while the entry to the feed line 31 is blocked so that the predetermined feed pressure can build up in the feed line 31. Additional details of the arrangement and function of the parts accommodated in the vessel, which can be closed in a pressure-resistant manner, are explained in the above-identified U.S. patent applications.

The closure arrangement permits the vessel as shown in FIG. 5 to be used as a housing for a safety installation wherein the parts of the safety installation disposed in the pressure-resistant fittings chamber 17 are accessible at any time for inspection and servicing after the closure parts 12 have been removed. Very few manual operations are required for this. In addition, relatively little work is required in order to assemble the vessel parts 1, 1a, 2a. As soon as the closure parts 12 are inserted, the safety installation is operational.

The invention thus a provides a closure arrangement which can be readily incorporated into pressure vessels in order to secure the pressure vessel parts securely together. In addition, the invention provides a closure for a pressure vessel which can be readily released.

Still further, the invention provides a closure which can be used for unpressurized vessels.

What is claimed is:

1. A pressure vessel comprising
   a first part defining a pressure chamber and having a first circumferential wall at one end of said chamber with an external groove having a radial depth which decreases over the longitudinal width thereof with the largest radial depth at an inner edge thereof;
   a second part defining a cover over said chamber of said first part, said second part having a second circumferential wall concentric to said first wall with an internal groove facing said external groove and having a radial depth which decreases over the width thereof with the largest depth at an inner edge of said internal groove and a duct extending through said second wall in communication with said internal groove; and
   a flexible rod-like closure part slidably mounted in said grooves to secure said parts together and extending into said duct for removal therethrough, said closure part having a cross-sectional diameter less than the width of at least one groove to permit relative axial movement between said first and said second parts, said diameter of said closure part being less than the sum of said largest depths of said grooves and equal to the sum of the smallest depths of said grooves.

2. A pressure vessel as set forth in claim 1 wherein the smallest depth of each groove is equal to one-half the diameter of said closure part.

3. A pressure vessel as set forth in claim 1 wherein said closure part is a cable.

4. A pressure vessel as set forth in claim 1 wherein said closure part is hollow.

5. A pressure vessel as set forth in claim 1 wherein said closure pat is a helically coiled metal wire.

6. A pressure vessel as set forth in claim 1 wherein at least one of said first and said second parts has a second groove and which further comprises a sealing ring in said second groove and between said first and second parts.

7. A pressure vessel as set forth in claim 1 wherein said second part includes a plurality of ducts extending therethrough to communicate with said pressure chamber.

8. A vessel comprising
   a first part defining a pressure chamber and having a first circumferential wall at one end of said chamber with an external groove having a depth which decreases over the width thereof with the largest radial depth at an inner edge;
   a second part defining a second chamber and having a second circumferential wall at one end of said second chamber with an external groove having a depth which decreases over the width thereof with the largest depth at an inner edge thereof;
   a third part defining a partition extending between said chambers of said first and second parts; said third part having a pair of oppositely extending walls concentric to said walls of said first and second parts, each of said oppositely extending walls having an internal groove facing said external groove of a respective one of said first and second parts and having a depth which decreases over the width thereof with the largest depth at an inner edge thereof, and a duct extending therethrough in communication with a respective groove thereof; and
   a pair of flexible rod-like closure parts, each closure part being slidably mounted in and between facing grooves of said third part and a respective one of said first and second parts, each closure part having a diameter less than the width of at least one of said grooves, less than the sum of said largest depths of said grooves receiving said closure part and equal to the sum of the smallest depths of said grooves.

9. A pressure vessel as set forth in claim 8 wherein said partition has a plurality of ducts extending therethrough, at least some of said ducts extending to a circumferential wall thereof.

10. A pressure vessel comprising
    a first part defining a pressure chamber and having a first circumferential wall at one end of said chamber with an external groove of a predetermined width and of a decreasing depth over said width to an inner edge part thereof;
    a cover over said chamber of said first part, said cover having a second circumferential wall concentric to said first wall with an internal groove of a predetermined width and of a decreasing depth over said width thereof to an inner edge part thereof, said internal groove facing said external groove and a duct extending through said second wall in communication with said internal groove; and
    a flexible rod-like closure part slidably mounted in said grooves to secure said cover to said first part and extending into said duct for removal therethrough, said closure part having a diameter less than said width of at least one of said grooves and equal to the sum of the smallest depths of said grooves to permit relative axial movement between said cover and said first part with said closure part disposed in said largest depth of at least one of said grooves.

11. A pressure vessel as set forth in claim 10 wherein the largest depth of said groove in said cover is distal from the end of said wall of said cover.

12. A pressure vessel as set forth in claim 10 wherein the smallest depth of each groove is equal to one-half the diameter of said closure part.

* * * * *

UNITED STATES PATENT AND TRADEMARK OFFICE
CERTIFICATE OF CORRECTION

PATENT NO. : 5,014,871
DATED : May 14, 1991
INVENTOR(S) : Heinz Mutter It is certified that error appears in the above-identified patent and that said Letters Patent is hereby corrected as shown below:

```
Column 1, line 40 change "object to the" to -object of the-
Column 1, line 43 change "object to the" to -object of the-
Column 1, line 50 change "circumferencial" to -circumferential-
Column 2, line 34 change  "FIG. 5 FIG. 5" to -FIG. 5-
Column 2, line 42 change "of cylindrical" to -of a cylindrical-
Column 5, line 68 change "pat" to -part-
```

Signed and Sealed this

Eighth Day of December, 1992

*Attest:*

DOUGLAS B. COMER

*Attesting Officer*  *Acting Commissioner of Patents and Trademarks*